(12) United States Patent
Kirk et al.

(10) Patent No.: US 10,376,818 B2
(45) Date of Patent: *Aug. 13, 2019

(54) FILTER BACKWASH NOZZLE

(71) Applicant: EXTERRAN WATER SOLUTIONS ULC, Calgary (CA)

(72) Inventors: Todd William Kirk, Rockyview County (CA); Daniel Clifford Whitney, Cochrane (CA); Douglas Walker Lee, Calgary (CA)

(73) Assignee: EXTERRAN WATER SOLUTIONS ULC, Calgary, Alberta (*) Notice: Subject to any disclaimer, the term of this patent is extended or adjusted under 35 U.S.C. 154(b) by 0 days.

This patent is subject to a terminal disclaimer.

(21) Appl. No.: 15/866,388

(22) Filed: Jan. 9, 2018

(65) Prior Publication Data

US 2018/0126301 A1 May 10, 2018

Related U.S. Application Data

(63) Continuation of application No. 14/718,549, filed on May 21, 2015, now Pat. No. 9,943,784.

(30) Foreign Application Priority Data

May 19, 2015 (CA) .................................... 2891856

(51) Int. Cl.
*B05B 1/34* (2006.01)
*B01D 24/46* (2006.01)
*B01D 24/14* (2006.01)
*B01D 24/40* (2006.01)

(52) U.S. Cl.
CPC ......... *B01D 24/4626* (2013.01); *B01D 24/14* (2013.01); *B01D 24/40* (2013.01); *B01D 24/4631* (2013.01); *B05B 1/341* (2013.01); *B05B 1/3405* (2013.01); *B05B 1/3463* (2013.01)

(58) Field of Classification Search
CPC .... B01D 24/14; B01D 24/40; B01D 24/4626; B01D 24/4631; B05B 1/3405; B05B 1/341; B05B 1/3415; B05B 1/3426; B05B 1/3431; B05B 1/3436; B05B 1/3447
USPC ........ 239/466, 486, 494, 496, 497, 555, 590
See application file for complete search history.

(56) References Cited

U.S. PATENT DOCUMENTS 6,701,957 B2 * 3/2004 McCarty ................. F16K 47/04
137/625.3

* cited by examiner

*Primary Examiner* — Jason J Boeckmann
(74) *Attorney, Agent, or Firm* — D. Doak Horne

(57) ABSTRACT

A nozzle is disclosed for use within a filter for inputting a jetting stream into the filter media to clean the filter media. The nozzle comprises an inlet for communication with a jetting stream source, and a plurality of plates stacked parallel and abutting one another. The plurality of plates comprises at least a top plate and a bottom plate, one of the plates having an aperture through the center thereof for receiving the jetting stream, wherein between adjacent plates at least one space is provided extending from the outside edge of the plates to the interior of plates and in fluid communication with the aperture for channeling the jetting stream radially outward from and substantially parallel with the longitudinal plane of the plate.

12 Claims, 19 Drawing Sheets

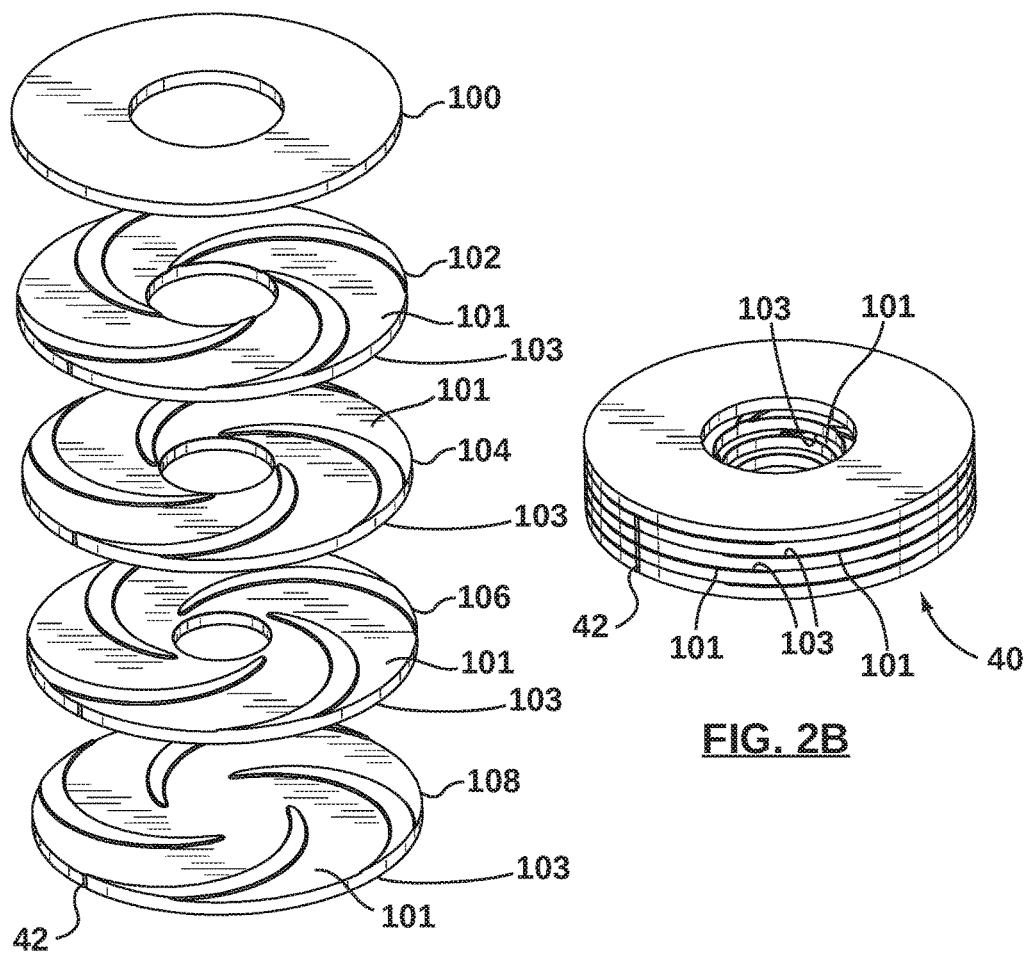

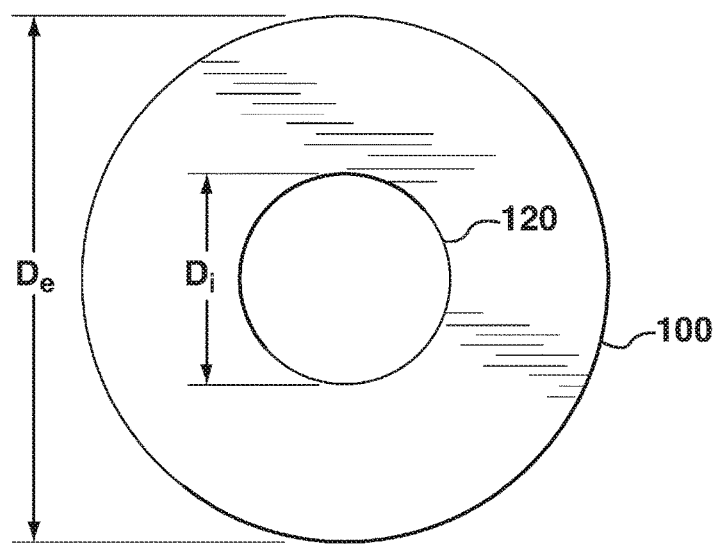
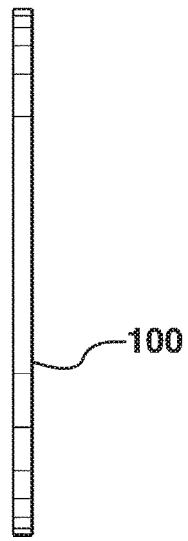
FIG. 3A                FIG. 3B
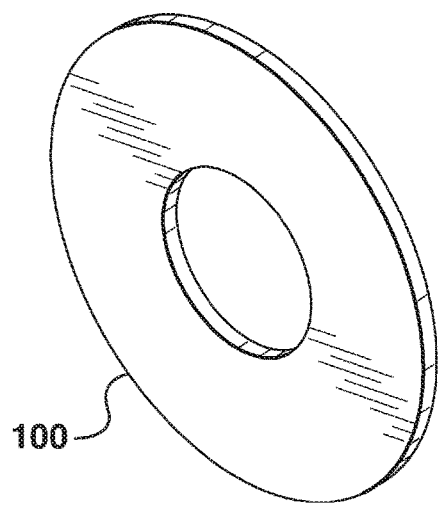
FIG. 3C

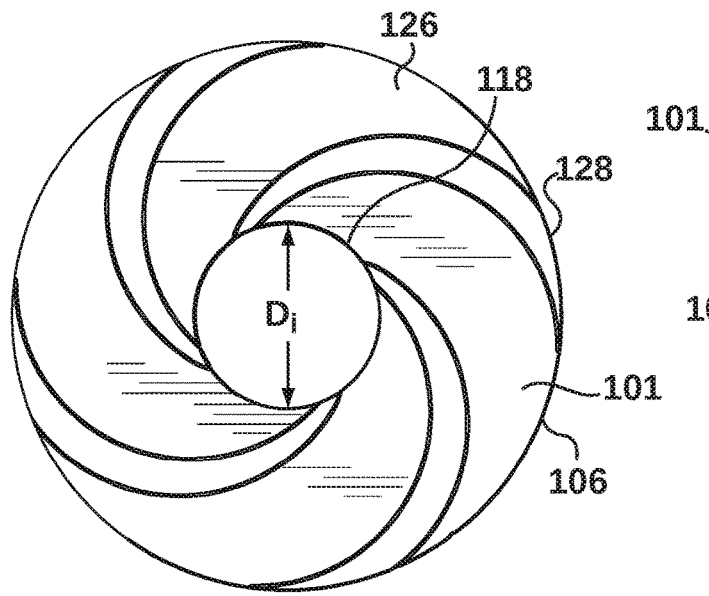
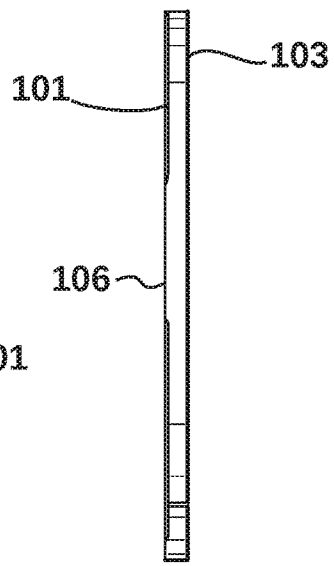
FIG. 6A  FIG. 6B
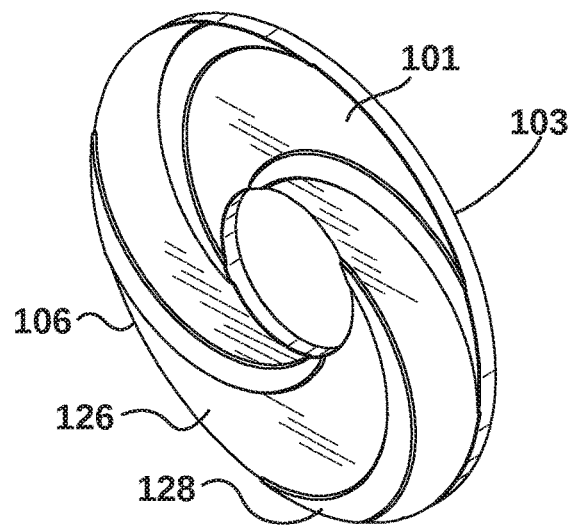
FIG. 6C

FILTER BACKWASH NOZZLE

CROSS-REFERENCE

This application is a continuation of U.S. patent application Ser. No. 14/718,549 filed on May 21, 2015, which claims the benefit of priority from Canadian Patent Application no. 2,891,856 filed on May 19, 2015 (now issued on Nov. 8, 2016 as Canadian Patent no. 2,891,856).

FIELD OF THE INVENTION

The present invention relates generally to the field of liquid filtration using non-fixed filter media, and more specifically to a nozzle for use in a method and system for removing filtered contaminants from non-fixed filter media filter beds, such as granular filter media filter beds, during periodic cleaning cycles.

BACKGROUND

Various types of methods and systems have been used to remove accumulated contaminants from a bed of granular filter media. The methods utilized to date generally have the following common processing steps: 1) providing an agitation means to break-up agglomerations of filter media and contaminants typically formed during the filtration process, 2) flowing a carrier medium through the agitated granules to mobilize the contaminants away from the filter media, 3) retaining the filter media while allowing contaminants to flow out, and 4) returning the cleaned filter media back to its normal state. These four steps can be condensed to the following: 1) agitation, 2) washing, 3) separating, and 4) reforming.

With regard to common step 1, various means are disclosed to agitate the filter media such as rotary blades and high-velocity liquid jets (See U.S. Pat. Nos. 2,521,396 and 3,992,291/3,953,333). However, both of these methods create at least two significant problems. First, rotary blade systems often have mechanical seals that require frequent maintenance. Second, the high-velocity liquid jets produce large volumes of dirty backwash water that must be stored and recycled through the process. What is needed in the art is an agitating means that does not require rotating internal baffles or impellers and reduces or minimizes liquid usage.

With regard to common step 2, the carrier medium used to flush the filter media is most commonly the clean filtrate fluid. In many systems, large volume storage of clean filtrate is required to provide surge capacity when the backwash cycle draws a high-volume rate to flush the media during this step. Some methods utilize the high-volume water jets to both agitate and back flush, which is a combination of common steps 1 and 2. However, such systems still generate large volumes of backwash liquid that must be stored and recycled back through the process. Also, it would be ideal to utilize contaminated process fluid for backwashing instead of clean filtrate. This would avoid having to have clean filtrate storage vessels and pumps specifically for periodic backwashing cycles.

With regard to common step 3, separation of the contaminants from the filter media is typically done by flowing the slurry in a continuous flow path over a cleaning element, located external to the filter housing, where interspersed larger particulates are removed from the slurry, and returning the withdrawn filter material back to the filter housing (See U.S. Pat. Nos. 3,992,291 and 3,953,333). This method adds significant cost and size to the filter since it requires various external conduits, vessels, valves and equipment. U.S. Pat. No. 4,787,987 discloses an in-situ method of separating the contaminants from the filter media by a screen, of size slightly smaller than the filter media size, contained within the vessel below the filter media. That method agitates and slurrifies the media and contaminants by action of a high-volume liquid pump. During this agitation step, make-up liquid is added to the vessel at substantially the same rate that the concentrated contaminated liquid is removed through the screen means while the filter media is retained within the filter housing.

A more recent development involves a method of in-situ cleaning of agglomerated contaminants from granular filter media. This method combines a low rate of contaminated liquid with a gas, such as air or natural gas, to create a jetting stream. This jetting stream is dispersed into the filter media through one or more radial nozzles disposed within the filter media. The gas exits the radial nozzles as a bubble dispersion within the liquid. As the jetting stream rises up through the filter media, it expands the bed to break large contaminant agglomerations and fluidizes the individual filter media granules to dislodge and mobilize smaller contaminant agglomerations within the interstitial spaces of the filter media. The radial nozzles consist of top and bottom circular plates of a diameter D and are spaced apart by a gap that is smaller than the smallest sized filter media granule. The two plates are separated by a spacer washer and bolted together which creates dead areas around the circumference of the jet where the bolts block the flow. Further, the two plates limit the amount of flow.

A need exists for an improved nozzle that avoids the need for a spacer washer while allowing for consistent flow of a jetting stream generally radially outward from the nozzle and consistent flow rates and/or pressures across the height of the nozzle.

SUMMARY OF THE INVENTION

In one embodiment, the present invention provides for a nozzle for use within a filter for inputting a jetting stream into the filter media, the nozzle comprising:

an inlet for communication with a jetting stream source;

a plurality of plates stacked parallel and abutting one another, the plurality of plates comprising at least a top plate and a bottom plate, one of the plates having an aperture through the center thereof for receiving the jetting stream, wherein between adjacent plates at least one space is provided extending from the outside edge of the plates to the interior of plates and in fluid communication with the aperture for channeling the jetting stream radially outward from and substantially parallel with the longitudinal plane of the plate.

In a further embodiment of the nozzle or nozzles outlined herein, the plurality of plates further comprising one or more intermediate plates have a top side facing towards the top plate and a bottom side facing towards the bottom plate and each intermediate plate comprises an aperture through the center thereof for receiving the jetting stream, the apertures of the intermediate plates and the top plate being in fluid communication.

In a further embodiment of the nozzle or nozzles outlined herein, the space is provided by a channel in the one of the plates and the side of the adjacent parallel stacked and abutting plate.

In a further embodiment of the nozzle or nozzles outlined herein, the space is provided by a channel on the top side of each plate and the bottom side of the adjacent parallel stacked and abutting plate.

In a further embodiment of the nozzle or nozzles outlined herein, the channel in the plate further defines a ridge which abuts the bottom side of the adjacent parallel stacked and abutting plate.

In a further embodiment of the nozzle or nozzles outlined herein, there are a plurality of spaces between each adjacent plate.

In a further embodiment of the nozzle or nozzles outlined herein, the ridge has an impellor shape for guiding the jetting stream radially outward from the aperture.

In a further embodiment of the nozzle or nozzles outlined herein, the ridge has a height of between 2 and 30 mm.

In a further embodiment of the nozzle or nozzles outlined herein, a total number of plates is from 2 to 9.

In a further embodiment of the nozzle or nozzles outlined herein, the total number of plates is from 3 to 7.

In a further embodiment of the nozzle or nozzles outlined herein, the total number of plates is 5.

In a further embodiment of the nozzle or nozzles outlined herein, the total number of plates is 6.

In a further embodiment of the nozzle or nozzles outlined herein, the interior diameter of each aperture in the center of the intermediate plates and the top plate is successively reduced for plates positioned towards the bottom plate.

In a further embodiment of the nozzle or nozzles outlined herein, the reduction in interior diameter of the aperture in the center of plates is sufficient to substantially counteract the reduction in flow volume or flow rate of the jetting stream as it approaches the bottom plate.

In a further embodiment of the nozzle or nozzles outlined herein, the gap defined by the distance between stacked plates is successively reduced for plates positioned towards the bottom plate.

In a further embodiment of the nozzle or nozzles outlined herein, the reduction in the gap is sufficient to substantially counteract the reduction in flow volume or flow rate of the jetting stream as it approaches the bottom plate.

In a further embodiment of the nozzle or nozzles outlined herein, the plates comprise an aligning notch in their outer periphery enabling visual or physical alignment of the stacked rings prior to connection of the plates.

In a further embodiment of the nozzle or nozzles outlined herein, the plates of the nozzle are welded together, preferably welded at a position of the outer periphery thereof.

In a further embodiment of the nozzle or nozzles outlined herein, an outer diameter of each the plates of the nozzle is substantially equal.

In a further embodiment of the nozzle or nozzles outlined herein, an outer diameter of each of the plates of the nozzle is substantially varied.

In a still further embodiment, the present invention provides for a nozzle for use within a filter for inputting a jetting stream into the filter media, the nozzle comprising:

an inlet for communication with a jetting stream source;

a plurality of plates stacked parallel and abutting one another, the plurality of plates comprising at least a top plate, one or more intermediate plates and a bottom plate, the top plate and the intermediate plates having an aperture through the center thereof for receiving the jetting stream, wherein between adjacent plates a plurality of spaces are provided extending from the outside edge of the plates to the interior of the plates and in fluid communication with the aperture in the center of the plates for channeling the jetting stream radially outward from and substantially parallel with the longitudinal plane of the plates;

wherein the plurality of spaces is provided by a plurality of channels in the one of each of the plates and the side of the adjacent parallel stacked and abutting plate and wherein each channel is defined by a flanking ridge that abuts the adjacent parallel stacked and abutting plate, each ridge having an impellor shape for guiding the jetting stream radially outward from the aperture; and wherein the interior diameter of each aperture in the center of the intermediate plates and the top plate is successively reduced for plates positioned towards the bottom plate and/or the gap defined by the distance between stacked plates is reduced successively for plates positioned towards the bottom plate.

In a further embodiment of the nozzle or nozzles outlined herein, the nozzle includes between 3 and 9 plates, between 4 and 7 plates, 5 plates or 6 plates.

BRIEF DESCRIPTION OF THE DRAWINGS

FIG. 2A is an exploded view of one example of a backwash nozzle for inputting a jetting stream for backwash cleaning of a filter media;

FIGS. 2B and 2C are assembled isometric views of one example of a backwash nozzle for inputting a jetting stream for backwash cleaning of a filter media, wherein FIG. 2C is an enlarged version of FIG. 2B;

FIGS. 3A, B and C are top, side and isometric views, respectively, of an example of a top plate of one example of a backwash nozzle for inputting a jetting stream for backwash cleaning of a filter media;

FIGS. 6A, B and C are top, side and isometric views, respectively, of another example of another inner plate of one example of a backwash nozzle for inputting a jetting stream for backwash cleaning of a filter media;

DETAILED DESCRIPTION

Described herein are methods, systems, apparatuses, techniques and embodiments suitable for providing a nozzle for use in cleaning filter media, optionally in a backwash cleaning method and optionally in a filter comprising non-fixed filter media. It will be appreciated that the methods, systems, apparatuses, techniques and embodiments described herein are for illustrative purposes intended for those skilled in the art and are not meant to be limiting in any way. All reference to dimensions, capacities, embodiments or examples throughout this disclosure, including the Figures, should be considered a reference to an illustrative and non-limiting embodiment or an illustrative and non-limiting example.

Figure 1:
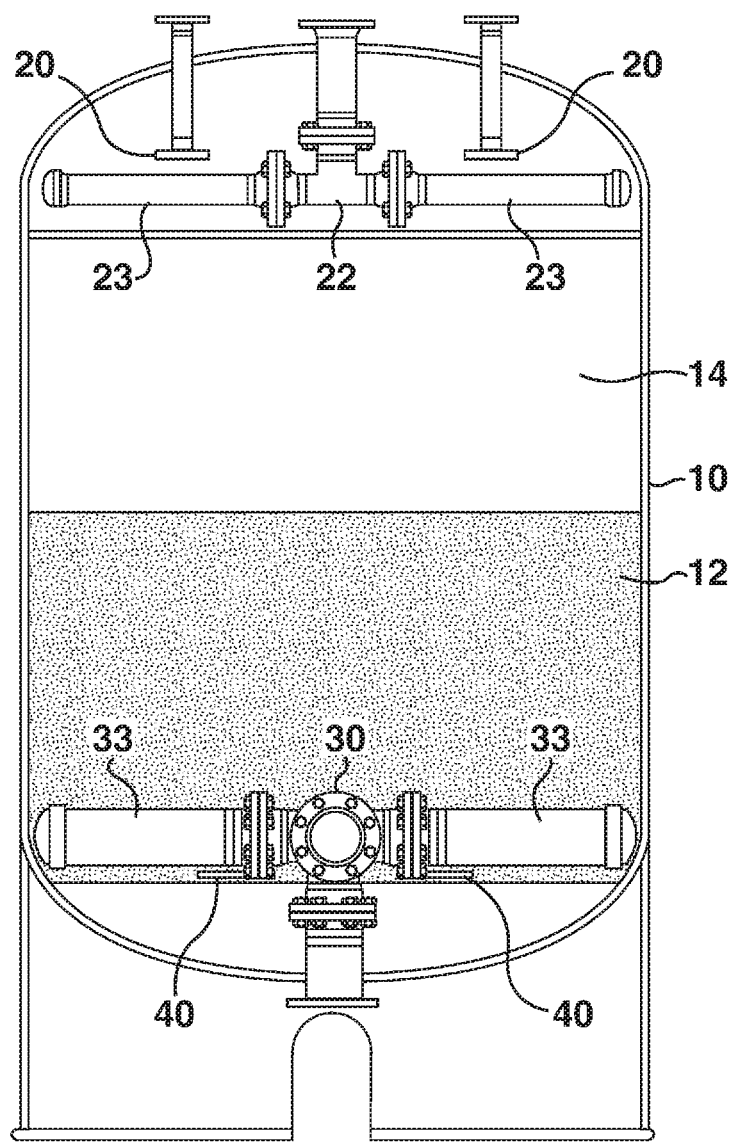
FIG. 1 is a vertical sectional view of an example of a non-fixed media housing, showing internal components including an example of a backwash nozzle encompassed by the present invention that may be used for inputting a jetting stream for backwash cleaning of a filter media.
Figure 2C:
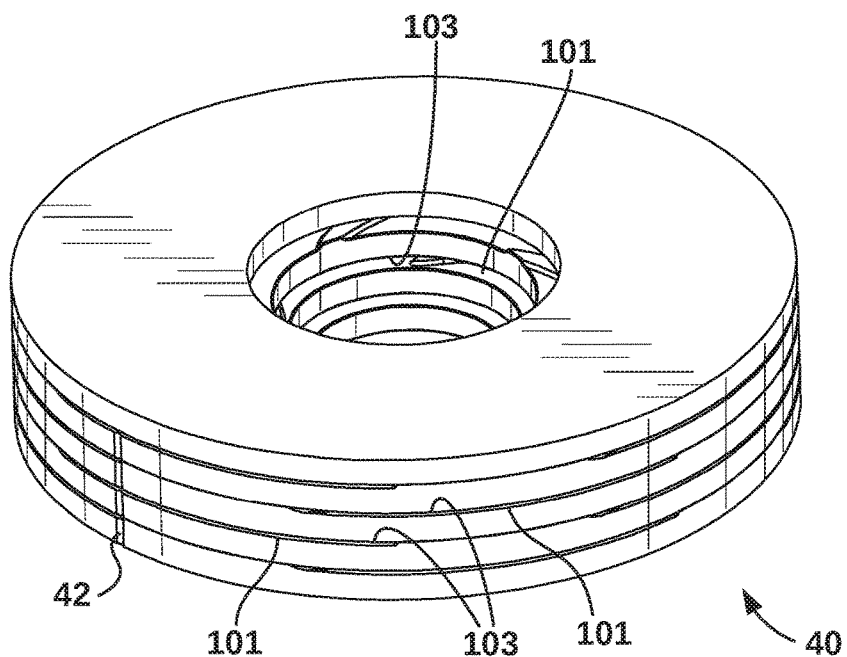
Figure 2D:
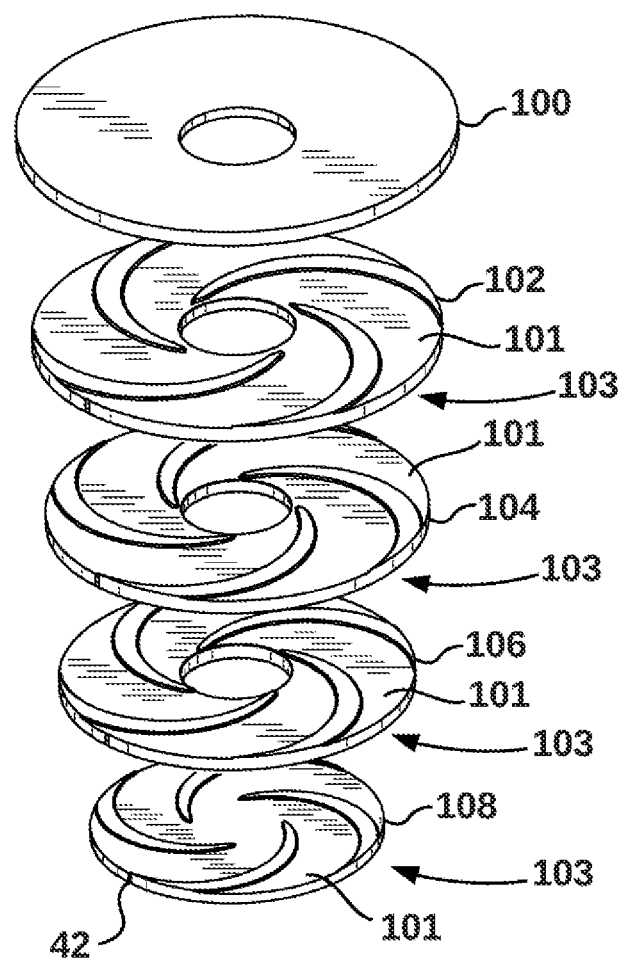
FIGS. 2D to 2F are exploded views of some examples of a backwash nozzle for inputting a jetting stream for backwash cleaning of a filter media, according to some embodiments of this disclosure.
Figure 2E:
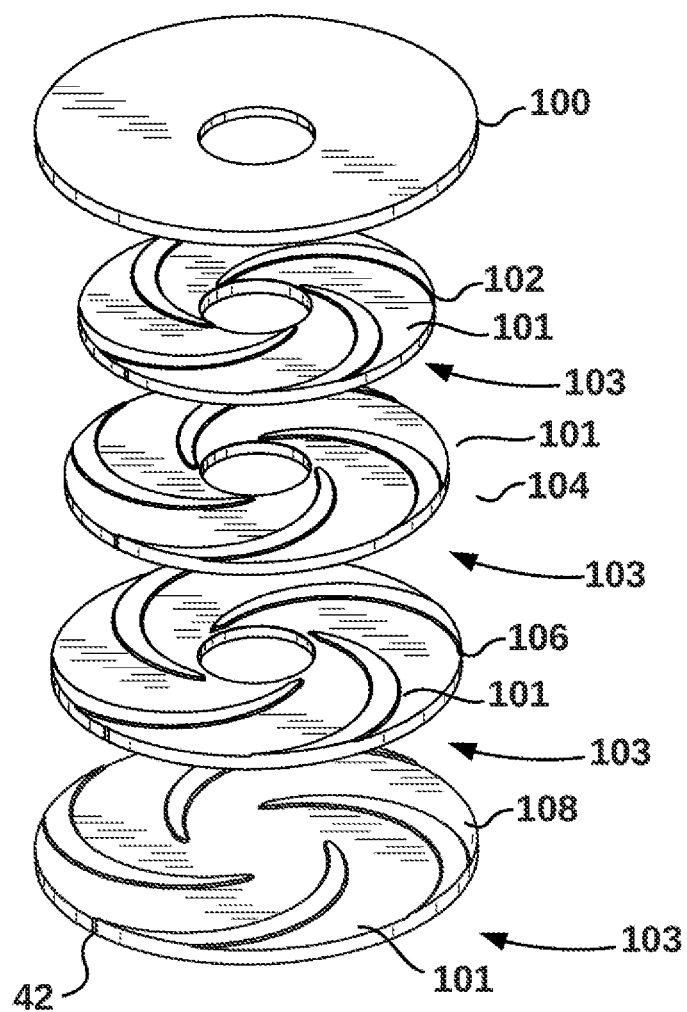
Figure 2F:
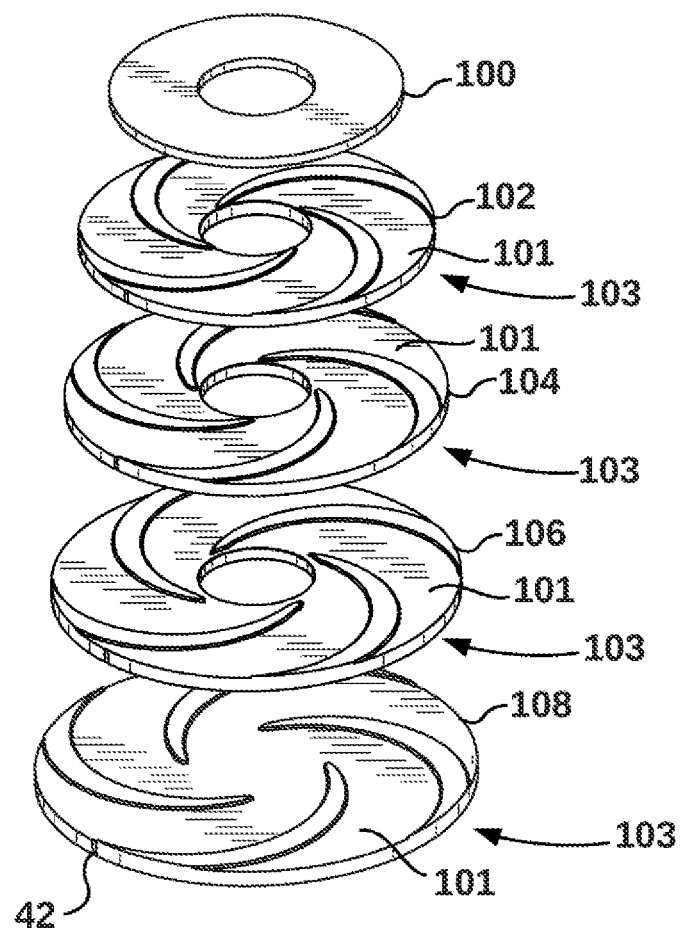
Figures 4A, 4B:
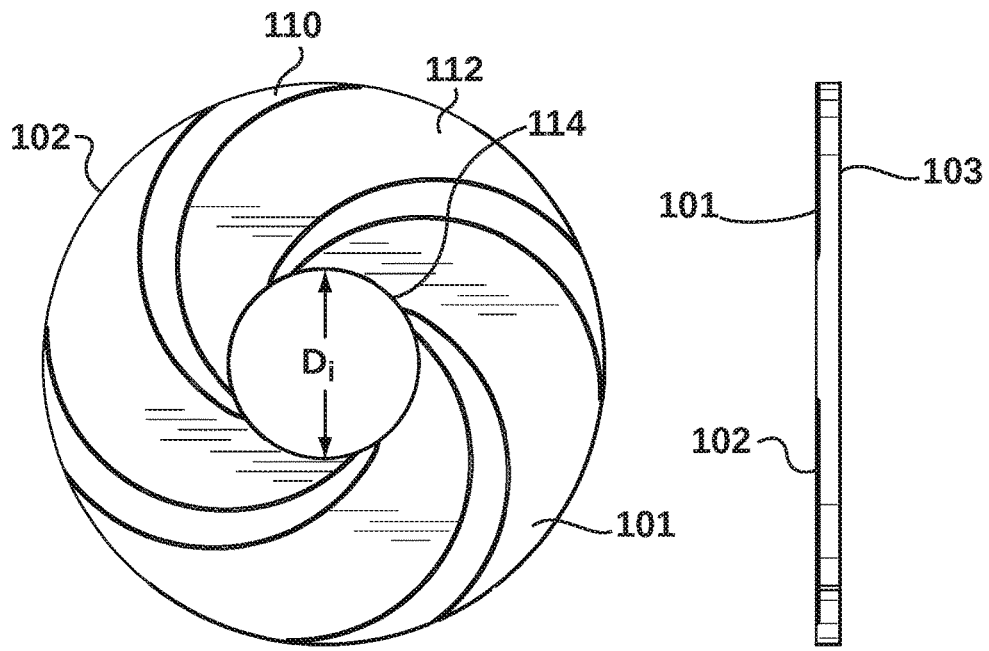
FIGS. 4A, B and C are top, side and isometric views, respectively, of an example of an inner plate of one example of a backwash nozzle for inputting a jetting stream for backwash cleaning of a filter media.
Figure 4C:
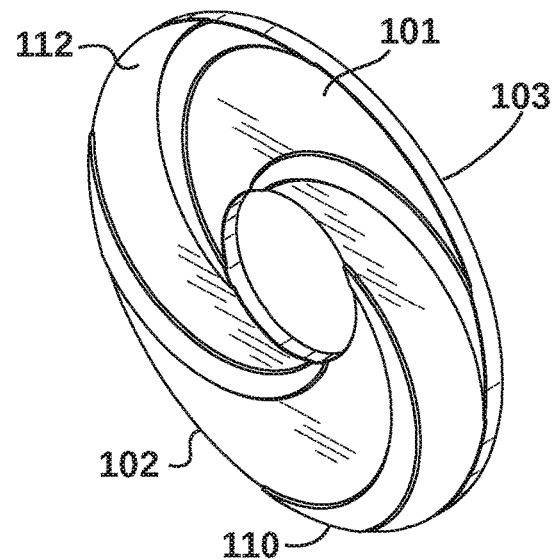
Figures 5A, 5B:
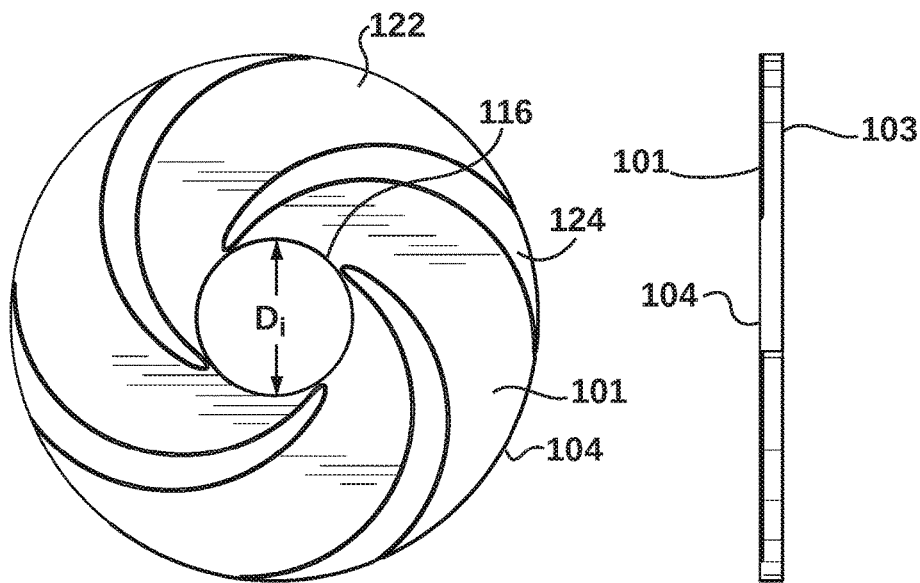
FIGS. 5A, B and C are top, side and isometric views, respectively, of another example of another inner plate of one example of a backwash nozzle for inputting a jetting stream for backwash cleaning of a filter media.
Figure 5C:
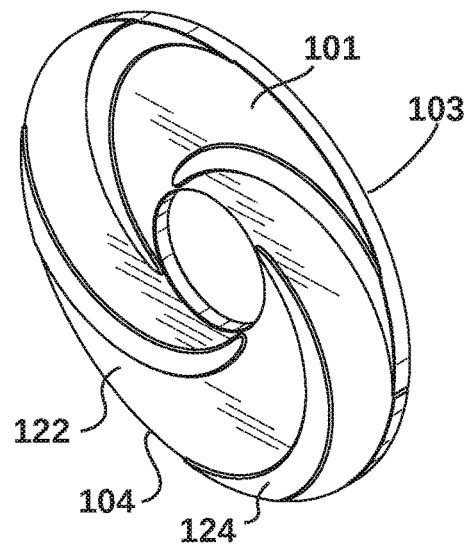
Figures 7A, 7B:
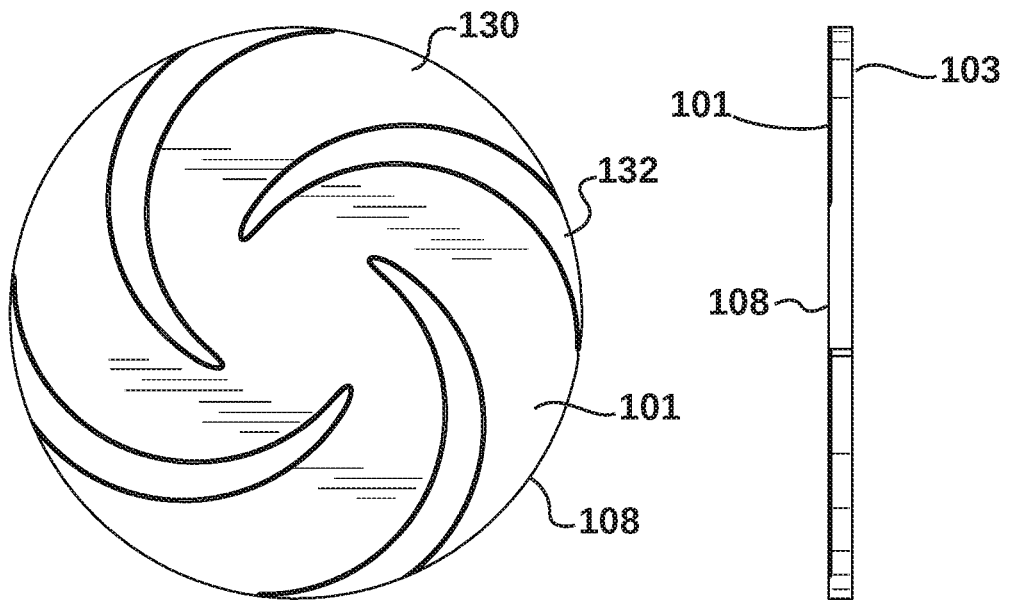
FIGS. 7A, B and C are top, side and isometric views, respectively, of an example of a bottom plate of one example of a backwash nozzle for inputting a jetting stream for backwash cleaning of a filter media.
Figure 7C:
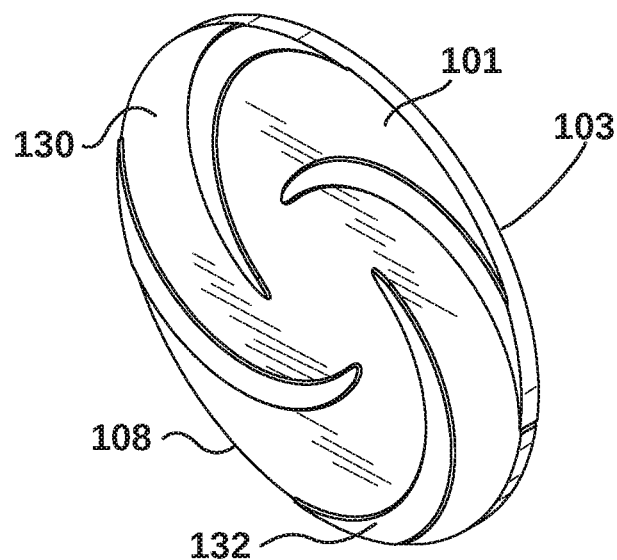

Referring to FIG. 1, an example of a typical filter vessel 10 is illustrated that may employ a nozzle or nozzles in accordance with various aspects of the present invention. The filter vessel 10 houses a bed 12 of granular filter medium. The illustrative filter housing is a pressure-rated vessel having a 2:1 ellipsoidal upper and lower heads. Other filter vessel shapes and designs may be used and will not affect the principle operation of the invention. The granular filter media 12 may be any of a number of materials chosen based upon the characteristics of the liquid to be filtered and the properties of the contaminants. For filtration of water containing suspended oil droplets and solids contaminants, a number of different granulated media may be used, such as for example, granulated black walnut shells, ceramic, sand, and/or multimedia. A space 14 exists above the filter bed 12 to provide room for the bed to expand during the cleaning cycle. It will be appreciated that any suitable filter housing, granular filter media and/or space dimension may be utilized.

The filter vessel 10 typically also includes inlet distributors 20 for the introduction of contaminated liquid from an exterior conduit and dispersing the liquid substantially uniformly across the cross-section of the filter vessel. A backwash outlet header 22 may also be installed in the top of the filter vessel for receiving flow of jetting stream and liberated contaminants during a cleaning cycle, for example a backwash cycle. The outlet header may also contain a mechanical sieve means 23, shown here as slotted pipe or wedge-wire where the open slots are of a diameter less than the smallest media granule size to prevent any mobilized filter media from escaping the vessel during the backwash cycle. Although this figure shows separate process fluid inlet and backwash outlet devices, many inlet distributor designs combine both process fluid distribution and backwash extraction. The description of the inlet is illustrative of one embodiment and other feed inlets may be utilized depending on the characteristics of the liquid to be filtered and the contaminants contained therein.

FIG. 1 also shows an example of an outlet header 30 to which may be attached a mechanical sieve 33, shown here as slotted pipe or wedge-wire. After passing through the filter bed, the cleaned filtrate exits the filter vessel through the openings in the sieve 33. The diameter of the sieve openings is typically smaller than the smallest filter media granule diameter so that the media is retained inside the vessel during operation.

FIG. 1 shows a plurality of radial nozzles 40 having outlets just below the bottom tangent of the mechanical sieves 33. It will be appreciated by those skilled in the art that the size and shape of the outlet sieves 33 and the number of radial nozzles employed will be dependent on the diameter of the filter housing, the volume of backwash desired, the depth, diameter and/or volume of non-fixed media to be cleaned, etc.

An example of the nozzle 40 shown in FIG. 1 is shown in more detail with reference to FIGS. 2 to 7. The nozzle 40 is comprised of a plurality of plates, generally two or more, and in various embodiments two to nine plates and in further embodiments between four and seven plates, the plates arranged parallel and adjacent each other. It will therefore be appreciated that the nozzle 40 shown with reference to FIGS. 2 to 7 which comprises five plates is merely illustrative of one embodiment of a nozzle according to the present invention and it is not intended to be limited to the number of plates.

The nozzle 40 is comprised of at least a top plate 100 and a bottom plate 108. In the embodiment shown in FIGS. 2 to 7 the nozzle includes further intermediate plates. Each plate comprises opposite flat surfaces 101 and 103. The cleaning jetting flows through the center aperture 120 in the top plate 100 and the center aperture 114, 116 and 118 in each of the intermediate plates 102, 104 and 106, respectively, and radially outward through channels formed in each of the intermediate plates and the bottom plate. As shown more clearly, for example in FIGS. 4 to 7, the intermediate plates of the nozzle 40 and the bottom plate include a ridge such as that shown as 110, 124, 128 and 132 in FIGS. 4 to 7, respectively. Each of the ridges 110, 124, 128 and 132 extends from a flat surface 101 and defines a channel shown as 112, 122, 126 and 130 in FIGS. 4 to 7, respectively, which together with the adjacent plate define a space or void through which the jetting stream flows into the filter media bed during the cleaning cycle.

Each plate of the nozzle 40 is stacked parallel, adjacent and abutting the next plate and as such, the space or void has a height defined by the depth of the channel (or the height of the ridge) in each plate. The height of the space, and therefore the height of the ridge, should be less than a minimum diameter of the media to be cleaned in the filter to ensure that the media, especially if the media is non-fixed, does not penetrate into the space in the nozzle during regular operation or flow of the fluid through the filter. Typically, the height of the ridge may be from 2-30 mm. The plates may include a notch 42 that may be used for aligning the plates for connection therebetween. For example, the plates may be welded to each other, for example on the outer periphery. For example, the plates may be tack welded on the outer periphery where the ridges meet the adjacent plate.

In the embodiments shown throughout the Figures, the ridges are shown as having an impeller shape for providing both the void or space between the channel and bottom side of the adjacent plate as well as for guiding the jetting stream radially outward from the nozzle. It will however be appreciated that any number of shapes may be used. The shapes and their % of open area may be used to control velocity and flow, and may be modified to suit different processes and fluids.

The ridges, for example the impellers, may be offset or staggered to aid or allow in evenly distributing the flow of the jetting stream radially outward from the nozzle. It will be appreciated that there is not flow where the ridge prevents flow across the plate outward from the inner aperture. Therefore, offsetting the ridges allows for more even flow radially outward from the inner aperture of the nozzle. Offsetting of the ridges may be adjusted as required or desired and if different shaped ridges are used. As compared to plates which are bolted together, even in a plurality of plates, the bolts/washers are generally in line in each stage (gap) of the nozzle thereby not allowing or at least reducing flow outward about the entire circumference.

The ridges, including impeller shaped ridges, may be machined into the plates or may be added using any suitable means.

Each of the intermediate plates and as well as the top plate include an aperture at the center of the plate to allow for the jetting stream to pass into the nozzle for partial redirection radially outward through the spaces or voids defined by the channel of each plate and the underside of the adjacent plate. The bottom plate does not include an aperture as the jetting stream does not pass the bottom plate but is completely redirected radially outwards. To facilitate maintaining a consistent flow rate radially outwards from the center of the nozzle across all of the plates of the nozzle, each aperture of each plate may be successively smaller to account for the reduction in flow rate and flow volume of the jetting stream as the jetting stream is radially output by each plate. To this end, each aperature has a diameter Di wherein each diameter Di of a successive plate may be smaller than the previous plate.

The diameters of each plate may be adjusted/modified based on the process as desired or required given the application. There is a well-known relationship between velocity (v)/flow rate (Q)/diameter (or cross sectional area): $Q=v*A$ where Q is the flow rate, v is the velocity, and A is the cross sectional area.

It will be appreciated that more plates allow for more flow thereby generally increasing the radius of influence, reducing the number of jets required, making it more economical to ideally achieve beneficial media bed lift. This can also reduce blocking potential from the media. Multiple plate design can also allow for more flexibility in flow rates.

Alternatively or in addition to reducing the internal diameter of the aperture in each plate, the gap defined by the distance between adjacent or neighboring plates in the stack may be adjusted to influence flow rate or volume and as a result the radius of influence. In one embodiment, the gap may be reduced successively for plates positioned towards the bottom plate to counteract the reduction in flow thereby substantially equalizing flow rate.

Figure 8:
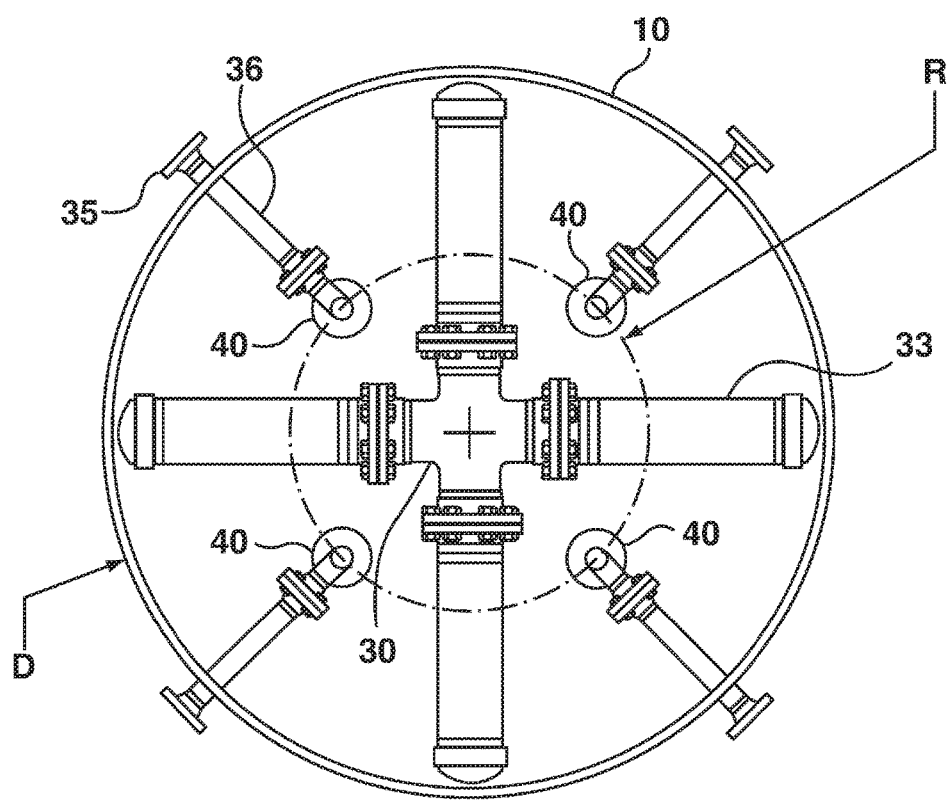
FIG. 8 is horizontal sectional view across the filter housing diameter, showing an example of a possible position of the jetting nozzles in a 45° angle between a filtrate outlet sieve manifold.
Figure 9:
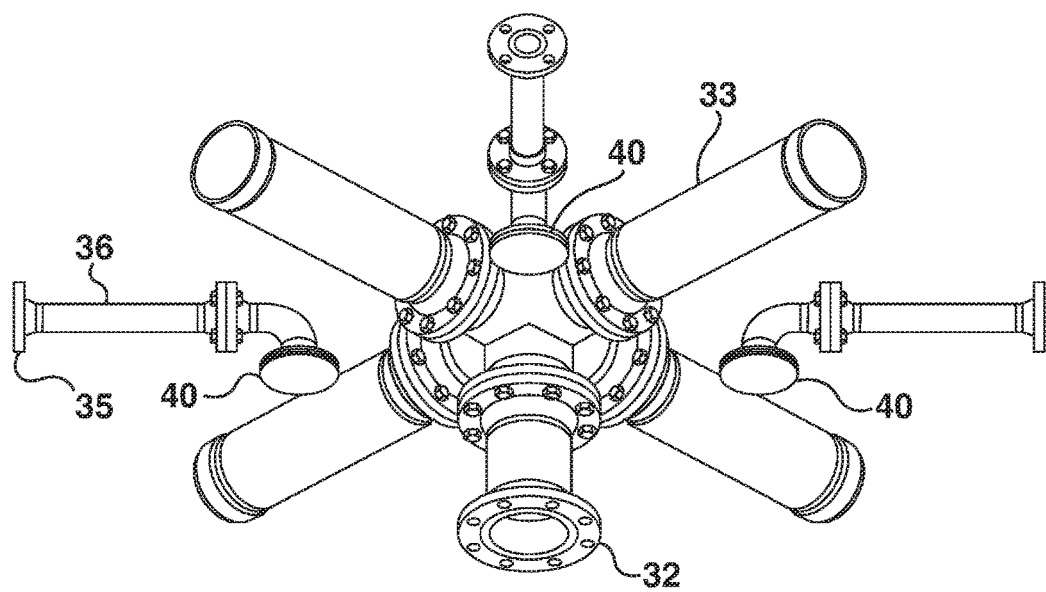
FIG. 9 is a three-dimensional view of the FIG. 8 embodiment as viewed from the underside of the filter housing vessel.

With reference to FIGS. 1, 8 and 9, a typical but non-limiting elevation of the radial nozzle outlet void is shown as being approximately even with the bottom tangent of the mechanical sieve pipes 33. In many filter vessels, the bottom vessel head may be filled with a solid material, such as grout or concrete, up to the bottom of the mechanical sieve pipes. This solid material acts as a support base for the filter media granules during normal filter operations since filter media below the mechanical sieve pipes is essentially of no effective use. Normally, the radial nozzle outlet voids are placed near the bottom tangent of the sieves pipes 33 so that filter media near the base of the tank can be contacted by the jetting stream. The placement of nozzles near the base of the filter media bed also allows the jetting stream to clear the openings of the sieve slots of possible media or contaminant obstructions. For applications where contact with the media near the base or jetting of the sieve is not required or desired, the height of the outlet voids of the radial nozzles may be elevated above the outlet manifold so that the jetting dispersion can penetrate to the full extremities of the vessel without interference from the outlet manifold or sieve screens.

The jetting stream, which may be comprised of a mixture of liquid and gas premixed outside of the filter housing, may be carried to the radial nozzle via a conduit 35. This conduit is shown in the drawing as a straight pipe segment connected to a pipe 90° elbow turning down and connected to the top circular disc of radial nozzle.

For most filter vessel sizes shown, four radial nozzles placed in the proximate center of each quadrant formed by the cross-shaped outlet manifold and sieve pipes will provide adequate coverage of the jetting stream throughout the filter bed cross-section. The lateral extent to which the radial nozzles disperse the jetting stream is predominantly set by the rate of water and gas. Therefore, the balance between increasing the water/gas flow rate to each radial nozzle or increasing the number of radial nozzles across the vessel cross-section is largely a question of economics. The number of nozzles may be increased as needed to substantially cover the cross-section of the filter vessel, while the placement of the nozzles is largely dictated by cross-sectional symmetry.

FIGS. 8 and 9 show an optional placement of a plurality of nozzles 40 across the vessel cross-section in relation to a vessel/nozzle centerline radius R. This vessel nozzle radius R will vary with filter media type, filter vessel diameter, contaminant loading, and contaminant physical properties. For this particular scenario, an R value in the range of 25% to 36% of the vessel diameter D will typically provide adequate coverage of the jetting stream for effective media agitation cleaning. Depending on vessel diameter and process: other arrangements may be used to generate sufficient coverage. Examples of other arrangements are outlined with reference to FIGS. 11 and 12.

Figure 10:
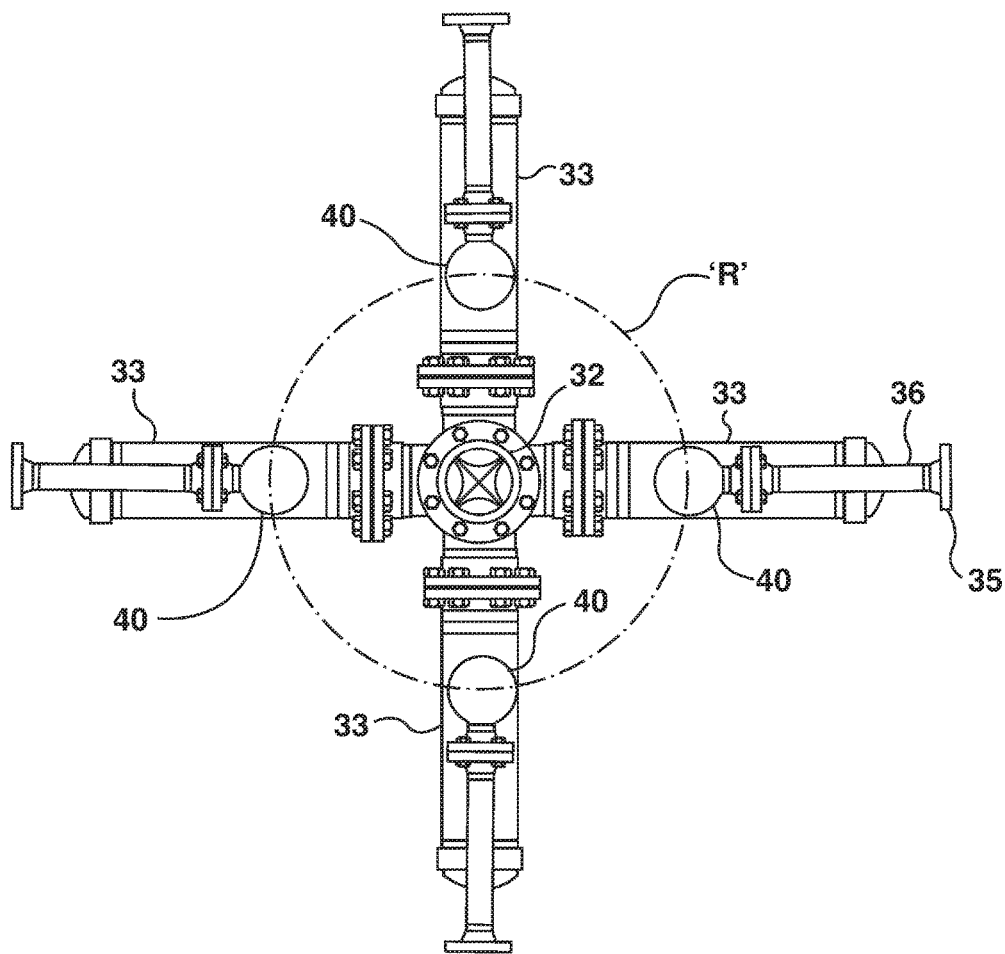
FIG. 10 is a top cross-sectional view similar to that shown in FIG. 8 but with the radial nozzles located just below and aligned with the outlet sieve manifold members showing an alternate location of the radial nozzles.

FIG. 10 shows an optional alternate location of the four nozzles shown as dotted circles 42 rotated 45° from the positions shown in FIG. 8 and FIG. 9 and located just below the mechanical sieve screens 33. By rotating the radial nozzles 40 in line with the mechanical sieve screens and elevating/lowering them just above/or below the top/or bottom tangent of the circular size screens, the jetting stream will have a reduced degree of interference with the sieve screens. These locations may, for example, be more desirable for filter applications where there are space constraints or based on the settling of the contaminants in the filter media. A benefit of these arrangements can be that "blind-spots" are minimized since the vertical movement of the jetting stream is not impeded by contact with the sieve screen members as may occur in other embodiments shown. It will be appreciated that multiple elevations may be used in a single application and that the invention is not limited to these locations or elevations.

Figure 11:
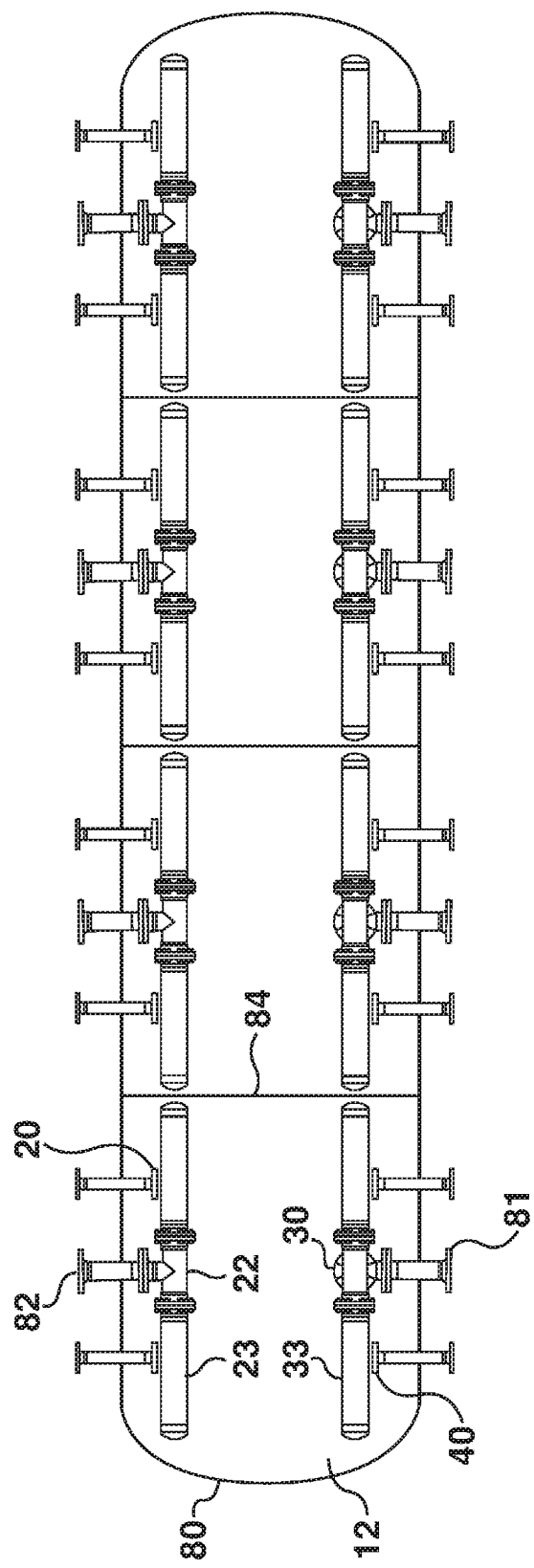
FIG. 11 shows an alternate embodiment wherein a plurality of filter housings, each incorporating internal components for carrying out a backwash cleaning method, the plurality of filter housings incorporated into one horizontal filter housing separated into individual compartments by internal baffles.

In reference to FIG. 11, an embodiment is presented wherein several filter housings, containing the internal members described herein for carrying out the cleaning method and shown in the previous Figures, are placed inside a singular horizontal vessel 80 and separated by a plurality of dividing baffles 84. Note that for clarification purposes, the component numbers of the embodiment in the figure are shown for one chamber and it is to be understood that each chamber has substantially identical components. Each filter chamber may contain a process inlet nozzle 82 and a process outlet nozzle 81. A plurality of piping conduits may connected to these inlet and outlet connections so that the process fluid may flow into each chamber in parallel. In such a filter, a large fluid processing volume is allowed without requiring a large number of radial nozzles to be installed to ensure adequate jetting coverage as might be required if the filtration were carried out in a single large filter vessel. Alternatively, the piping conduits connecting the chambers may be done so that the fluid to be filtered flows through each chamber in a series manner. Such a flow pattern may be advantageous where each chamber contains a different media type that has a unique affinity for a particular fluid contaminant or particle size. In this type of filter arrangement, the amount of jetting stream required to break-up and mobilize the contaminants during the cleaning cycle may be varied independently to each chamber to optimize the cleaning cycle.

The jetting stream flowing to the radial nozzles inside the filter housing may be comprised of a pre-mixed stream of a compressed gas and liquid flowing to each nozzle from a common header. Connected to this common header is a source of a pressurized gas and pressurized liquid. Each of these streams may flow into the common distribution header through a control element and metering device such that the filter operator can adjust the rate of gas and liquid flowing to the nozzles. Typical gas source is natural gas. However, any inert gas would be applicable. For economic reasons, the liquid source typically used by the inventors is the incoming contaminated process fluid.

The amount of liquid and gas flowing into the common header may largely be dependent on the overall size of the filter housing. It has been observed that approximately 9 gpm (gallons per minute) of water per square foot of bed area and 0.7 SCFM (standard cubic feet per minute) of gas per cubic foot of bed provide adequate performance for cleaning black walnut shells filtering oil and solids from produced water. Converting these values to a common volumetric unit gives a typical value of 1.7 cubic feet of liquid per square feet of bed area per standard cubic feet of gas per cubic feet of filter media inside the housing. This ratio will vary to some extent based on the size of the vessel, the number of radial nozzles used, the size and volume of filter media being cleaned, and the physical characteristics of the contaminants. Therefore, it is understood that part of the operation of this type of filter is adjusting the liquid and gas stream rates to optimize the media cleaning cycle performance while minimizing the amount of contaminated liquid remaining for disposal or recycling.

Figure 12:
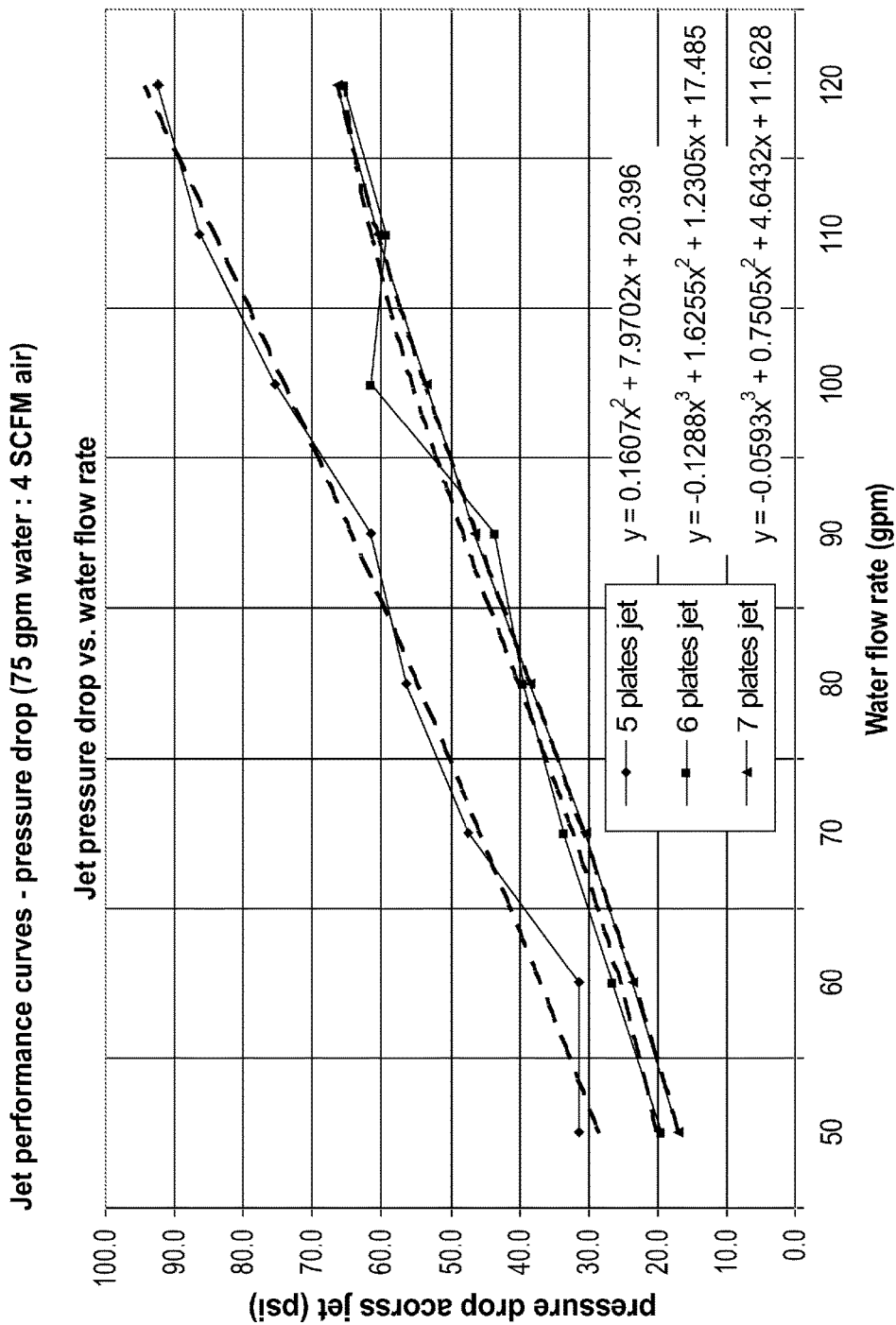
FIG. 12 is a graph plotting jet pressure drop versus water flow rate, for jets having 5 plates, 6 plates, and 7 plates respectively.
Figure 13:
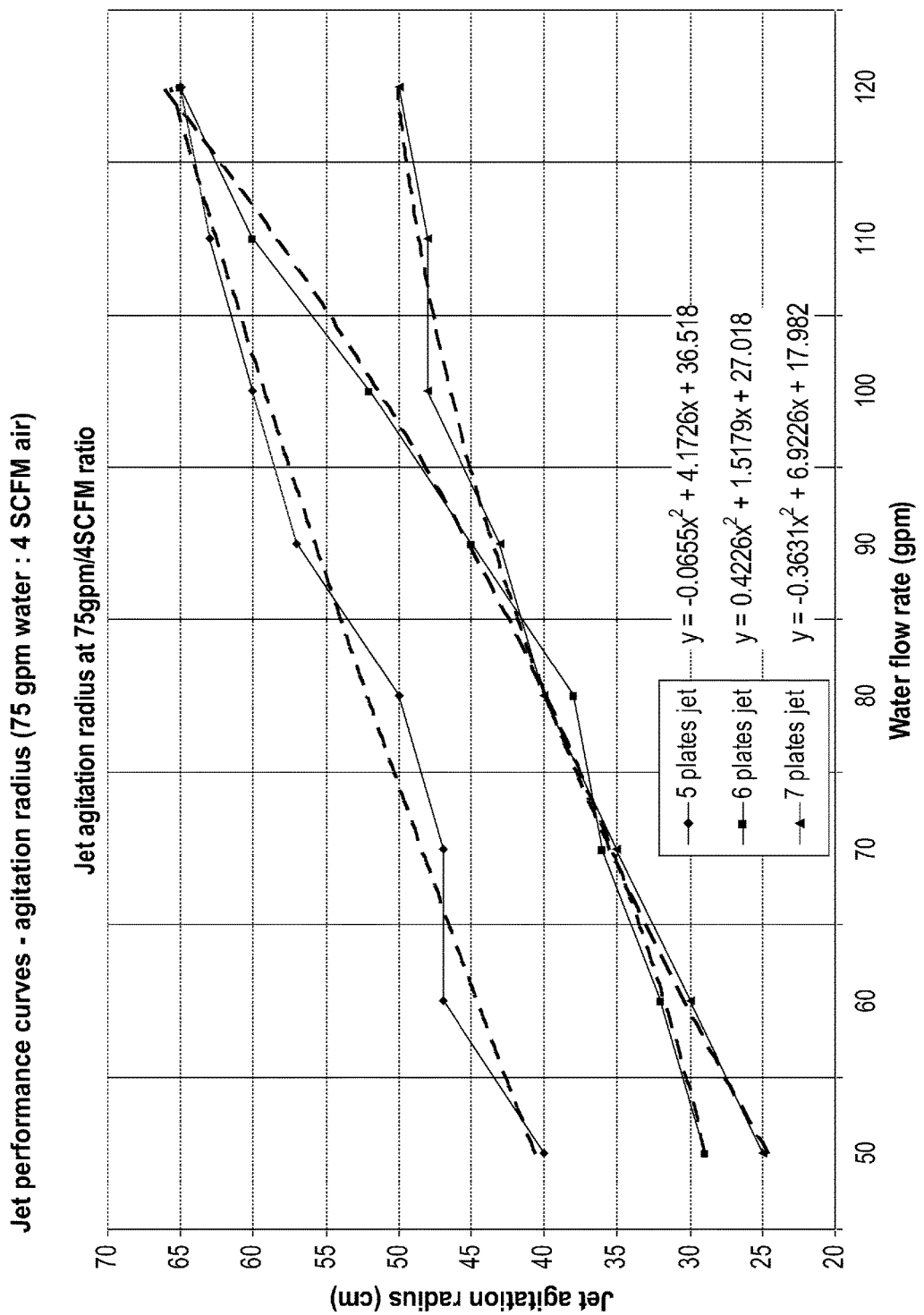
FIG. 13 is a graph plotting jet agitation radius in cm versus water flow rate (gpm) for jet nozzles having 5 plates, 6 plates, and 7 plates respectively.
Figure 14:
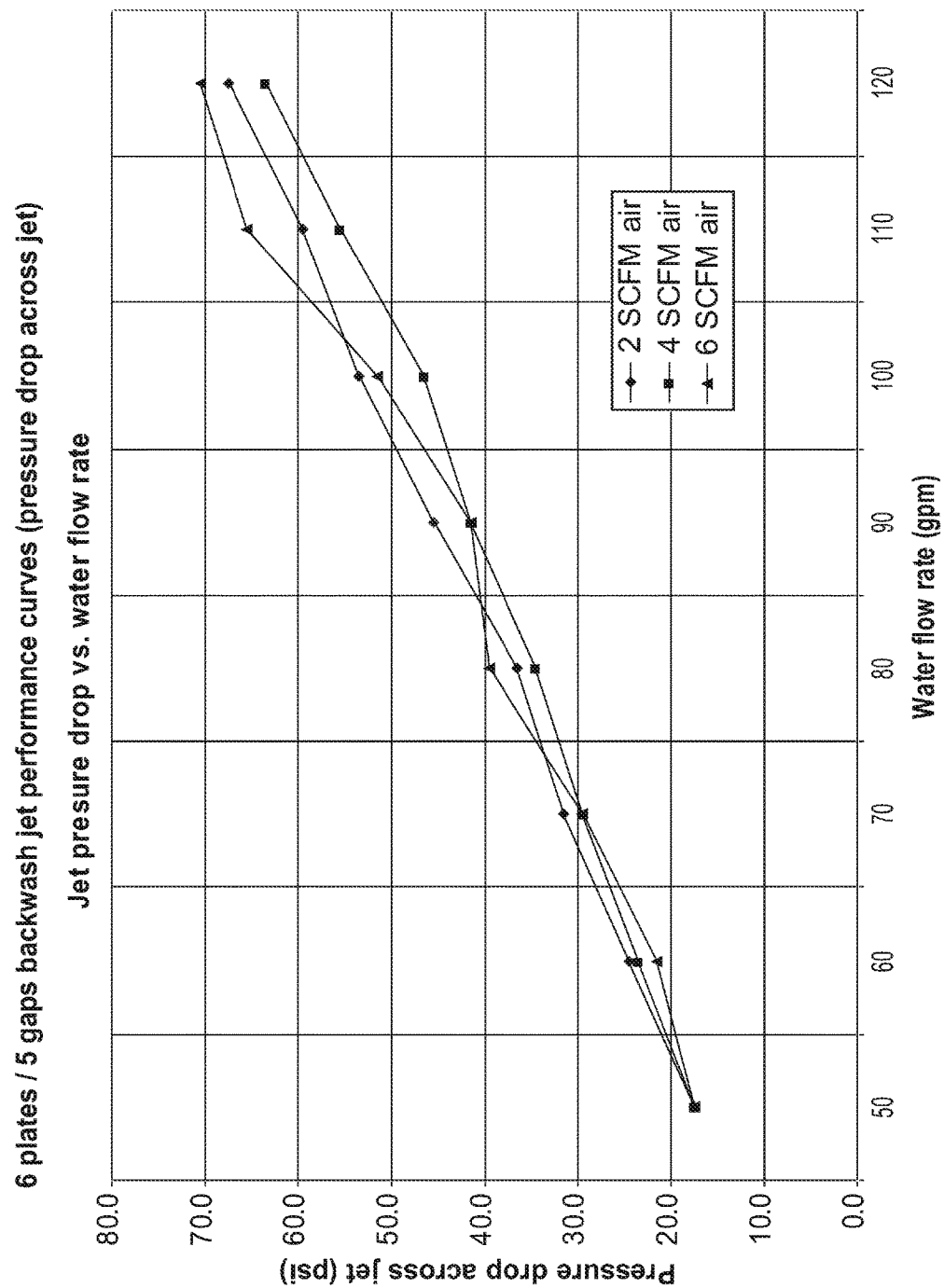
FIG. 14 is a graph plotting pressure drop across jet nozzle versus water flow rate for applications using various flow rates of air.
Figure 15:
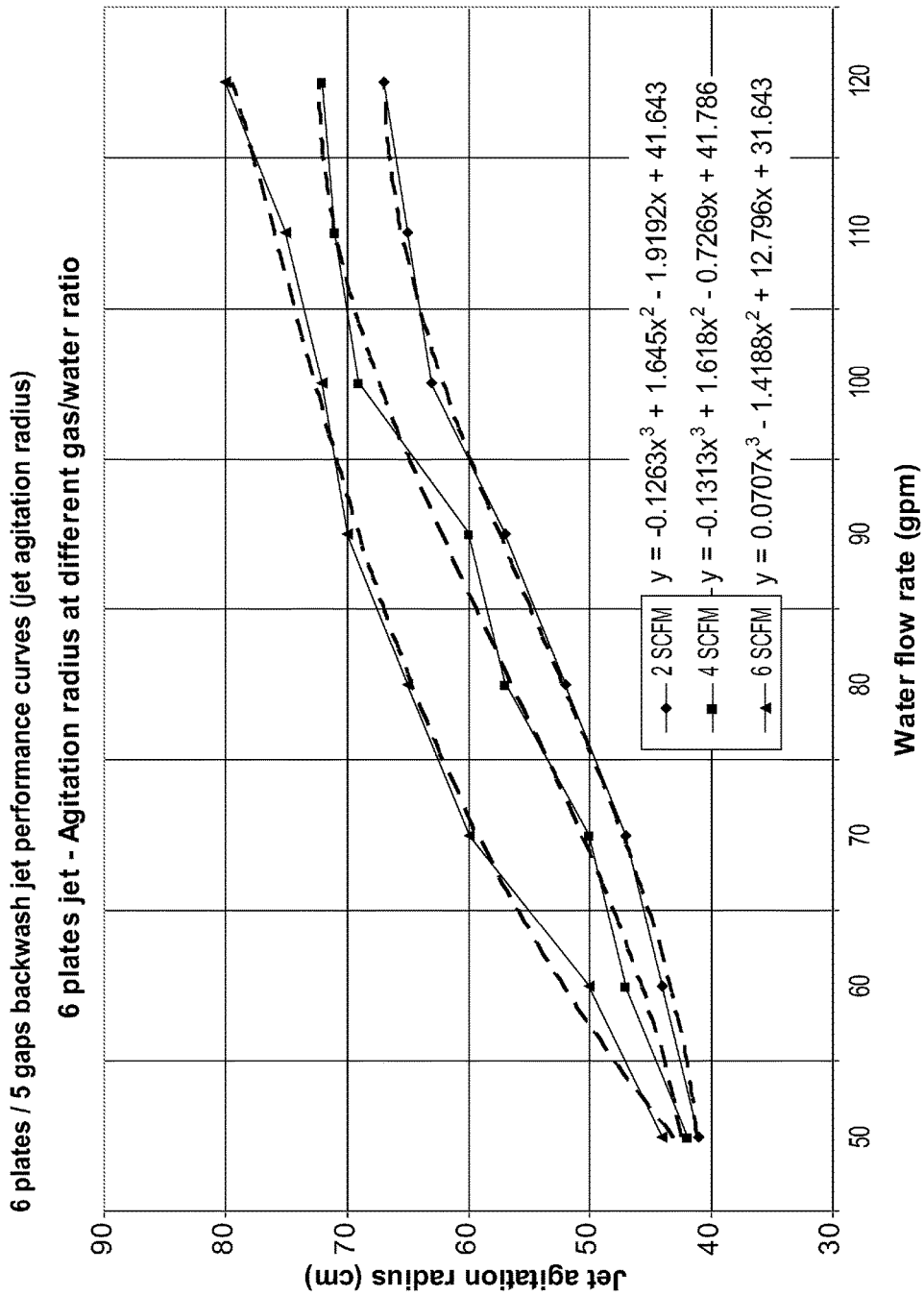
FIG. 15 is a graph plotting jet agitation radius versus water flow rate for a nozzle having 6 plates, with various flow rates of air, with the largest flow rate of air having the largest jet agitation radius.

FIGS. 12 and 13 shows additional illustrative embodiments of non-fixed media filter vessels 200 and 202, respectively, with various optional layouts of the radial nozzles 40 for inputting a jetting stream for cleaning the media, for example in a backwash cleaning cycle. FIGS. 12 and 13 simply show various optional positioning of the radial nozzles 40 in examples of filter vessels and are for the purpose of illustrating that a plurality of filter vessels, housings, architectures and/or headers may be implemented. FIG. 12 shows a vertical non-fixed media filter vessel 200 while FIG. 13 shows a horizontal non-fixed media filter vessel 202. The radial nozzles 40 may be nozzles such as those described herein, for example with reference to FIGS. 2-7.

It will be appreciated that that various modifications, amendments, variations, additions or alterations may be made to the apparatuses, systems and methods outlined herein without departing from the spirit or scope of the invention. Such modifications, amendments, variations, additions or alterations are intended to be within the contemplation of the invention.

We claim:

1. A nozzle for use within a filter for inputting a jetting stream into filter media, the nozzle comprising:
   an inlet for communication with a jetting stream source;
   a first plate and at least one second plate stacked parallel and in mutual juxtaposal position, the first plate having an aperture through the center thereof for receiving the jetting stream, each of the first and at least one second plate having opposite flat surfaces perpendicular to a stacking direction thereof,
   wherein each of the at least one second plate includes at least a pair of ridges on one of the opposite flat surfaces thereof defining a plurality of channels, each pair of ridges defining a respective channel between them and between said plate and a plate adjacent thereto;
   wherein each channel extends from an outside edge of the at least one second plate to an interior of the at least one second plate in fluid communication with the aperture for guiding at least a portion of the jetting stream in a radial, curvilinear outward direction from and substantially parallel with a longitudinal plane of the at least one second plate; and
   wherein a sum of circumferential widths of the plurality of channels along an edge of the aperture is substantially greater than a sum of circumferential widths of the ridges along the edge of the aperture.

2. The nozzle as claimed in claim 1, wherein said first and at least one second plate are thin and cylindrical, and wherein the respective outer diameters of said first and at least one second plate and any intermediate similarly stacked plates, progressively decrease or increase.

3. The nozzle as claimed in claim 1, wherein said pair of ridges comprises a plurality of ridges, and each ridge extends from an outside edge of the plates toward the center of each plate in a radial curvilinear manner for guiding at least a portion of the jetting stream from an interior of said nozzle outwardly in a radial, curvilinear outward direction and substantially parallel with a longitudinal plane of the plates.

4. A nozzle for use within a filter for inputting a jetting stream into filter media, the nozzle comprising:
   an inlet for communication with a jetting stream source; and
   a first plate and at least one second plate having respective flat surfaces and stacked parallel to each other with said flat surfaces spaced apart from each other, the first plate having an aperture through the center thereof for receiving the jetting stream, said respective flat surfaces of each of the first and at least one second plate being opposite to each other and perpendicular to a stacking direction thereof;
   wherein at least one of the first and at least one second plate includes at least a pair of ridges on one of the opposite flat surfaces thereof which each abuts a respective flat surface on one of said first and at least one second plates adjacent thereto defining a plurality of channels, each pair of ridges defining a respective channel between them and between said plate and the plate adjacent thereto;

wherein each channel extends from an outside edge of said plate to an interior of said plate in fluid communication with the aperture for guiding at least a portion of the jetting stream in a radial, curvilinear outward direction from and substantially parallel with a longitudinal plane of said plate; and wherein sum of circumferential widths of the plurality of channels along an edge of the aperture is substantially greater than a sum of circumferential widths of the ridges along the edge of the aperture.

5. The nozzle as claimed in claim 4, wherein said first and at least one second plate are thin and cylindrical, and wherein respective outer diameters of said first and at least one second plate, and any intermediate similarly stacked plates, progressively decrease or increase.

6. The nozzle as claimed in claim 5, wherein said pair of ridges comprises a plurality of ridges, and each ridge extends from an outside edge of the plates toward the center of each plate in a radial curvilinear manner for guiding at least a portion of the jetting stream from an interior of said nozzle outwardly in a radial, curvilinear outward direction and substantially parallel with a longitudinal plane of the plates.

7. The nozzle as claimed in claim 1, wherein the outer diameters of the first and second plates are substantially varied.

8. The nozzle as claimed in claim 1, wherein the nozzle comprises a plurality of second plates, each of the plurality of second plates comprising an aperture through the center thereof; and wherein the apertures of the second plates have successively reduced diameters.

9. The nozzle as claimed in claim 1, wherein the ridges are of uniform length and a height of each channel is defined by a height of the ridges; and wherein said height of the ridges is less than a minimum nominal diameter of media to be cleaned in the filter.

10. The nozzle as claimed in claim 9, wherein the height of the ridges is between 2 and 30 mm.

11. The nozzle as claimed in claim 4, wherein the ridges are of uniform length and a height of each channel is defined by a height of the ridges; and wherein said height of the ridges is less than a minimum nominal diameter of media to be cleaned in the filter.

12. The nozzle as claimed in claim 11, wherein the height of the ridge is between 2 and 30 mm.

* * * * *